(12) United States Patent
Srinivas

(10) Patent No.: US 8,473,005 B2
(45) Date of Patent: Jun. 25, 2013

(54) FM TRANSMITTER FOR MOBILE COMMUNICATION DEVICE

(75) Inventor: Hari Srinivas, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/117,921

(22) Filed: Apr. 29, 2005

(65) Prior Publication Data

US 2006/0246944 A1 Nov. 2, 2006

(51) Int. Cl.
*H04M 1/00* (2006.01)

(52) U.S. Cl.
USPC .......................................................... 455/557

(58) Field of Classification Search
USPC ........................................ 455/557; 348/14.01
See application file for complete search history.

(56) References Cited

U.S. PATENT DOCUMENTS

| | | | |
|---|---|---|---|
| 5,408,686 A | 4/1995 | Mankovitz | 455/66 |
| 5,628,056 A | 5/1997 | Grysiewicz et al. | 455/89 |
| 5,867,794 A * | 2/1999 | Hayes et al. | 455/557 |
| 5,905,947 A * | 5/1999 | Stein | 455/90.3 |
| 5,946,604 A | 8/1999 | Bailey | 455/42 |
| 5,970,390 A | 10/1999 | Koga et al. | 455/42 |
| 6,052,603 A * | 4/2000 | Kinzalow et al. | 455/557 |
| 6,124,826 A * | 9/2000 | Garthwaite et al. | 342/357.09 |
| 6,163,711 A * | 12/2000 | Juntunen et al. | 455/557 |
| 6,173,195 B1 * | 1/2001 | Chen | 455/569.2 |
| 6,381,314 B1 * | 4/2002 | Walinski | 379/101.01 |
| 6,381,472 B1 * | 4/2002 | LaMedica et al. | 455/560 |
| 6,427,115 B1 * | 7/2002 | Sekiyama | 701/208 |
| 6,782,239 B2 * | 8/2004 | Johnson et al. | 455/42 |
| 6,928,308 B2 * | 8/2005 | Wang et al. | 455/569.2 |
| 7,233,808 B2 * | 6/2007 | Mooney et al. | 455/557 |
| 7,418,276 B2 * | 8/2008 | Van Bosch | 455/569.1 |
| 2002/0013852 A1 * | 1/2002 | Janik | 709/231 |
| 2002/0068600 A1 * | 6/2002 | Chihara et al. | 455/550 |
| 2002/0073205 A1 * | 6/2002 | Mostafa | 709/227 |
| 2002/0098813 A1 * | 7/2002 | Likourezos et al. | 455/93 |
| 2002/0102998 A1 * | 8/2002 | Lin | 455/466 |
| 2003/0036357 A1 * | 2/2003 | McGowan | 455/62 |
| 2003/0056220 A1 * | 3/2003 | Thornton et al. | 725/62 |
| 2003/0123677 A1 | 7/2003 | Tran | 381/81 |
| 2004/0171377 A1 | 9/2004 | Engstrom | 455/419 |
| 2005/0047587 A1 | 3/2005 | Green, III | 379/387.01 |
| 2005/0287958 A1 * | 12/2005 | Jui Sheng et al. | 455/88 |
| 2005/0289591 A1 * | 12/2005 | Vermola et al. | 725/45 |
| 2006/0063516 A1 * | 3/2006 | Grossman et al. | 455/414.3 |
| 2006/0179452 A1 * | 8/2006 | Amodeo et al. | 725/25 |

* cited by examiner

*Primary Examiner* — Lester Kincaid
*Assistant Examiner* — Diego Herrera
(74) *Attorney, Agent, or Firm* — Staas & Halsey LLP

(57) ABSTRACT

A mobile communication device for transmitting media content to a receiver assembly in proximity to the mobile communication device includes a transceiver assembly for communicating information with a wireless communication network, and a transmitter assembly for transmitting media content received via the wireless communication network to a receiver assembly in proximity to the housing of the mobile communication device. Media content may be received via a GPRS bearer service, an EDGE bearer service, a UMTS bearer service, and the like. The transmitter assembly is coupled with a software module for configuring the media content for reproduction as sound and/or video. For example, streaming audio data downloaded from the Internet may be configured via frequency modulation (FM) for radio frequency (RF) transmission to an RF receiver in proximity to the mobile communication device.

12 Claims, 2 Drawing Sheets

FM TRANSMITTER FOR MOBILE COMMUNICATION DEVICE

BACKGROUND OF THE INVENTION

The present invention relates generally to the field of mobile communication devices such as mobile telephones and palmtop computers, personal digital assistants (PDA's), and the like providing telephony features, and more particularly to a mobile communication device capable of transmitting media content such as streaming audio data downloaded from the Internet, or the like, received via a wireless communication network to a receiver assembly in proximity to the mobile communication device.

Mobile telephones, palmtop computers, personal digital assistants (PDA's), and the like, comprise a class of portable electronic devices whose size enables them to be held in one hand while being operated with the other. Often, such devices are connected to a wireless bearer service capable of providing access to a source of media content such as the Internet, allowing the user of the device to receive media content which may be stored in the device's memory, the memory of a computer system, or transmitted to others via the communication network.

The capability of such devices for reproducing media content, however, is typically limited by their portability. For instance, the selection of speakers which may be included with a mobile telephone is limited by the size of the mobile telephone. These limitations may restrict the reproduction quality of the media content available to the user via the mobile telephone. For example, a typical speaker included with a mobile telephone is generally not suitable for reproducing high fidelity sound required for playback of media containing music. Oftentimes the user of a mobile telephone is located in the proximity of an audio or video reproduction system which is capable of such high fidelity presentation. For example, the user may be in an automobile or like vehicle equipped with an AM/FM radio tuner, satellite radio tuner, or the like. In such instances, it would be advantageous to provide media content received via the mobile telephone to a receiver assembly in proximity to the mobile telephone for reproduction as sound and/or video.

SUMMARY OF THE INVENTION

Accordingly, the present invention is directed to a mobile communication device capable of transmitting media content received via a wireless communication network to a receiver assembly in proximity to the mobile communication device. The mobile communication device configures the media content for reproduction as sound and/or video prior to being transmitted to a receiver assembly for playback.

In exemplary embodiments, the mobile communication device includes components for providing wireless communication of voice and/or data information via a wireless communication network. For instance, the mobile communication device may comprise a cellular telephone, a satellite telephone, a PDA, a palm top computer, a portable gaming device, or other device (e.g., an FM stereo receiver, a satellite stereo receiver or an MP3 player device) equipped with telephony features and sized to be held with a user's hand. The mobile communication device includes a transceiver assembly for communicating information with a wireless communication network, such as a General Packet Radio Service (GPRS) bearer service, an Enhanced Data for GSM Evolution (EDGE) bearer service, a Universal Mobile Telecommunications System (UMTS) bearer service, a Code Division Multiple Access (CDMA) bearer service, a Personal Communications Service (PCS) bearer service, a Time Division Multiple Access (TDMA) bearer service, a Global System for Mobile Communication Circuit Switched Data (GSM (CSD)) bearer service, a Wireless Local Area Network 802.11x (WLAN(802.11x)) bearer service, or the like. In embodiments, the wireless communication network provides access to a source of media content, such as the Internet.

The mobile communication device may further include a transmitter assembly for transmitting media content received via the wireless communication network to the receiver assembly. Media content for transmittal via the transmitter assembly may include streaming audio data downloaded from the Internet via the wireless communication network, or the like. The transmitter assembly may be coupled with a software module for configuring the media content for reproduction as sound and/or video. For example, streaming audio data downloaded from the Internet may be configured via frequency modulation (FM) for radio frequency (RF) transmission, and the transmitter assembly may include an FM RF transmitter. The receiver assembly may be an FM radio tuner, or the like, for reproducing the RF transmission as sound.

In specific embodiments, the memory of the mobile communication device is capable of storing at least a portion of the media content for transmittal to the receiver assembly. For instance, the mobile communication device may be capable of storing an MP3 file, an MPEG-4 file, a portion of streaming audio/video, and the like. The memory may be configured as a cache for providing continuous transmittal of a streamed audio/video program. For example, when packets of streaming audio data are received via the wireless communication network, portions of the audio data may be stored in the memory and utilized with a timed delay, such that a stored portion of the audio data is broadcast by the transmitter assembly while another portion is being received via the wireless communication network.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF SPECIFIC EMBODIMENTS

Reference will now be made in detail to the presently preferred embodiments of the invention, examples of which are illustrated in the accompanying drawings.

Figure 1:
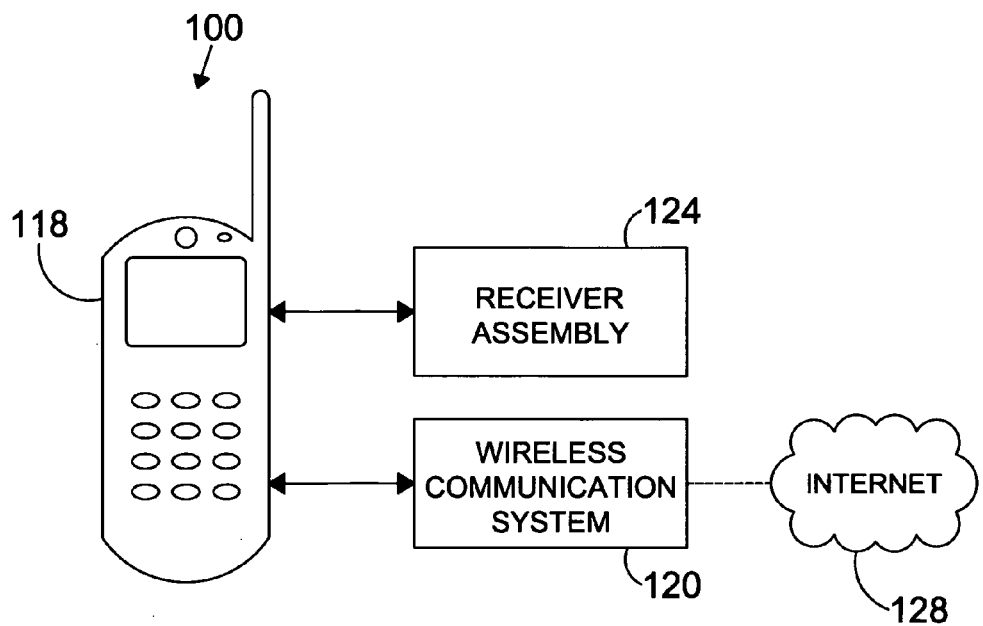
FIG. 1 is a diagrammatic illustration of a mobile telephone for transmitting media content to a receiver assembly in proximity to the mobile telephone, in accordance with an exemplary embodiment of the present invention.
Figure 2:
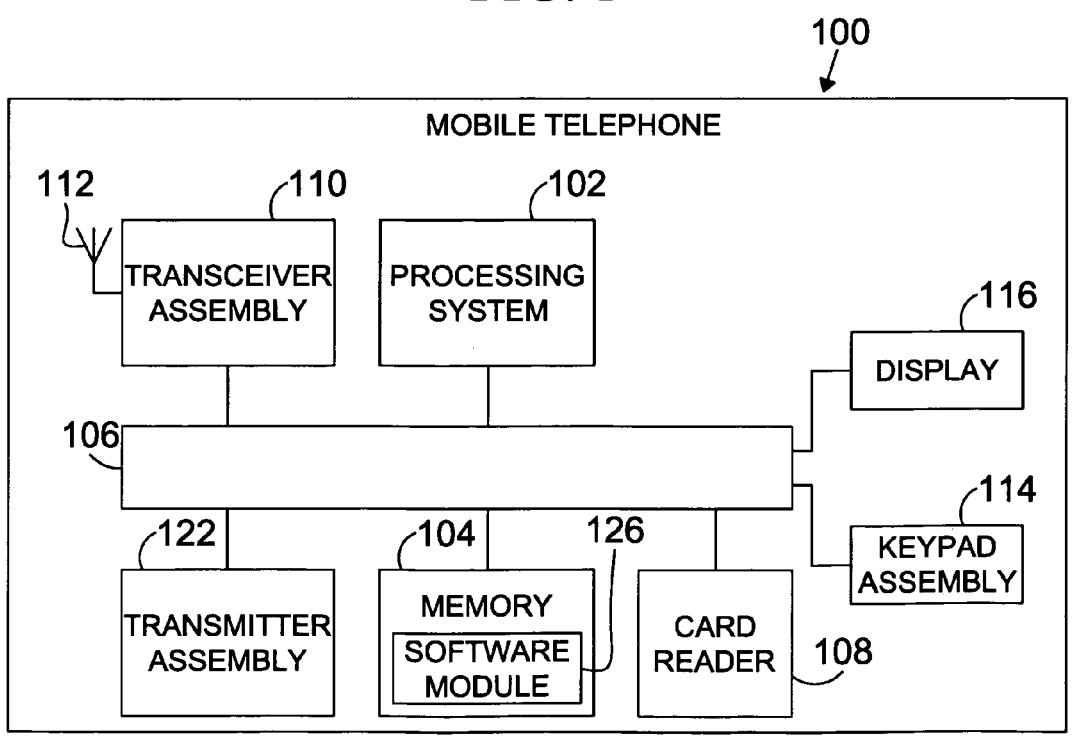
FIG. 2 is a block diagram of a mobile telephone in accordance with an exemplary embodiment of the present invention.

Referring to FIGS. 1 and 2, a mobile communication device, specifically mobile telephone 100, in accordance with an exemplary embodiment of the present invention is described. The mobile telephone 100 provides wireless communication of voice and/or data information with external sources such as a base station, a cellular communication system tower, another mobile communication device, or the like via a wireless communication network. While a mobile telephone 100 is depicted for purposes of illustration, it will be appreciated that the mobile communication device may alternatively comprise a satellite telephone, a PDA, a palm top computer, a portable gaming device, or another device (e.g., an FM stereo receiver, a satellite stereo receiver or an MP3 player device) equipped with telephony features to download audio files/channels and sized to be held within a user's hand without departing from the scope and intent of the present invention.

As shown in FIG. 2, the mobile telephone 100 includes a processing system 102 which controls the overall operation of the mobile telephone 100. The processing system 102 may include a general-purpose microprocessor, a digital signal processor (DSP), an application specific integrated circuit (ASIC), or the like. Exemplary processors 108 include the Advanced RISC Machines (ARM®) microprocessor and the Intel 186 processor which are currently used in mobile cellular telephones.

Memory 104 is coupled to the processing system 102 (e.g., via a bus or like interface 106) for storing information including the operating system utilized by the mobile telephone 100, address books, personal greetings, and the like. The memory 104 may comprise both non-volatile and volatile storage devices. In various embodiments, memory 104 utilized by the mobile telephone 100 may include random access memory (RAM), read-only memory (ROM), programmable erasable ROM, flash memory, and the like. Similarly, a data card reader 108 may be coupled to the processing system 104 via the interface 106 for receiving a removable data card providing additional memory for storing information including but not limited to telephone number information for the mobile telephone 100, address book information, security information, and the like. Exemplary data cards include subscriber identification module (SIM) cards, user identification module (UIM) cards, and the like.

A transceiver assembly 110, including a transmitter and receiver or transceiver and an antenna 112 transmit and receive data, including audio data and various other types of data such as text messaging utilized through a wireless communication network (e.g. the base station, the cellular communication system tower, another mobile communication device, or the like). The transceiver assembly 110 may further include signal conditioning circuitry (e.g., analog-to-digital converters, digital-to-analog converters), input/output buffer, and the like.

The mobile telephone 100 may further include input device such as a keypad assembly 114, or the like, for entry of alphanumeric information (e.g., telephone numbers, text messages, etc.), commands, and the like by the user. Similarly, a display 116 may be provided for displaying alphanumeric text, control menus (e.g., via a graphic user interface), prompts, and the like to the user. In exemplary embodiments, the mobile telephone 100 may further include common telephone components such as a microphone, a speaker, a ringer, a vibrator, and the like, which are not illustrated. Additionally, it is contemplated that the mobile telephone 100 may provide functions other than telephony. For example, the mobile telephone may provide functions common to handheld computers or personal digital assistants (PDAs), portable gaming devices, or the like. In such embodiments, the mobile telephone 100 further includes a suitable processing system, extended memory, a touch screen overlaying display for tactile input of data, or the like.

As shown in FIG. 1, the mobile telephone 100 includes a housing 118 sized to be held within the hand of a user. The transceiver assembly 110 is at least substantially contained within the housing 118 of the mobile telephone 100 for communicating information with a wireless communication network 120, e.g. a General Packet Radio Service (GPRS) bearer service, an Enhanced Data for GSM Evolution (EDGE) bearer service, a Universal Mobile Telecommunications System (UMTS) bearer service, a Code Division Multiple Access (CDMA) bearer service, a Personal Communications Service (PCS) bearer service, a Time Division Multiple Access (TDMA) bearer service, a Global System for Mobile Communication Circuit Switched Data (GSM (CSD)) bearer service, a Wireless Local Area Network 802.11x (WLAN (802.11x)) bearer service, or the like. In embodiments, the wireless communication network 120 provides access to a source of media content, such as the Internet 128.

A transmitter assembly 122 is provided within the housing 118 of the mobile telephone 100 for transmitting media content received via the wireless communication network 120 to a receiver assembly 124 in proximity to the housing 118. In one embodiment, the transmitter assembly 122 may include an antenna extending from the housing 118. In another embodiment, the transmitter assembly 122 is an Integrated Circuit (IC) including an antenna. In a still further embodiment, the transmitter assembly 122 is coupled with the antenna 112. Those of skill in the art will appreciate that while the mobile telephone 100 illustrated in the accompanying figures includes a separate transceiver assembly 110 and transmitter assembly 122, the transceiver assembly 110 may alternately comprise the transmitter assembly 122, being configured for transmitting media content to the receiver assembly 124.

In exemplary embodiments of the present invention, the media content for transmittal via the transmitter assembly 122 to the receiver assembly 124 comprises non-voice information, e.g. data downloaded from an audio broadcast channel, compressed digital audio such as an MP3 file, compressed digital video and/or audio such as an MPEG-4 file, streaming audio, streaming video, and the like. For instance, the media content may include streaming audio data downloaded from the Internet via the wireless communication network 120. In other embodiments, the media content may comprise data received via the wireless communication network 120 from an Ethernet, a Wireless Fidelity network (Wi-Fi), a Local Area Network (LAN), a Wide Area Network (WAN), an internet, and the like. Those of skill in the art will appreciate that media content may be received via other communication channels as well, without departing from the scope and intent of the present invention.

In one embodiment, the transmitter assembly 122 is coupled with a software module 126, or the like, for configuring media content received from the wireless communication network 120 for reproduction as sound and/or video. For example, streaming audio data downloaded from the Internet via a GPRS/EDGE/UMTS bearer service is configured for reproduction as sound, e.g. the streaming audio data for transmittal to the receiver assembly 124 is configured via frequency modulation (FM) for radio frequency (RF) transmission, and the transmitter assembly 122 comprises an FM RF transmitter. In this instance, the receiver assembly 124 may be included with an automobile's FM radio tuner, a stereo system's FM radio tuner, or the like, for reproducing the RF transmission as sound.

In another embodiment, MPEG-4 video downloaded from the Internet is configured for reproduction as video, e.g. the MPEG-4 video is configured in one of a variety of video formats for transmittal via Bluetooth, WirelessUSB, television transmission, or the like, to the receiver assembly 124. In this instance, the receiver assembly 124 may be included with a personal computer, a laptop computer, a television set, or a like device having a display for reproducing video. Those of ordinary skill in the art will appreciate that other communication mechanisms may be supported as well. Further, it is noted that a signal transmitted by the transmitter assembly 122 may include audio and video information combined into one signal, such as a television signal, or the like. Alternatively, the transmitter assembly 122 may broadcast separate signals for audio and video.

In another exemplary embodiment, the memory 104 of the mobile telephone 100 is capable of storing at least a portion of the media content for transmittal to the receiver assembly 124. For instance, the mobile telephone 100 may be capable of storing an MP3 file, an MPEG-4 file, a portion of streaming audio and/or video, and the like. Storing the media content may allow an operator of the mobile telephone 100 to transmit the media content to the receiver assembly 124 at a desired time. Further, it will be appreciated that the memory 104 may be configured as a cache mechanism for providing continuous transmittal of a streamed audio/video program or the like. Such a technique is especially useful when the media content is received in discrete portions of data, or packets. For example, when packets of streaming audio data are received via the wireless communication network 120, portions of the audio data may be stored in the memory 104 and utilized with a timed delay, so that a stored portion of the audio data is broadcast by the transmitter assembly 122 while another portion is being received via the wireless communication network 120. Those of skill in the art will appreciate that other techniques may be utilized for providing storage of media content, as well as for providing continuous transmittal of media content received in discrete portions, such as packets or the like.

Figure 3:
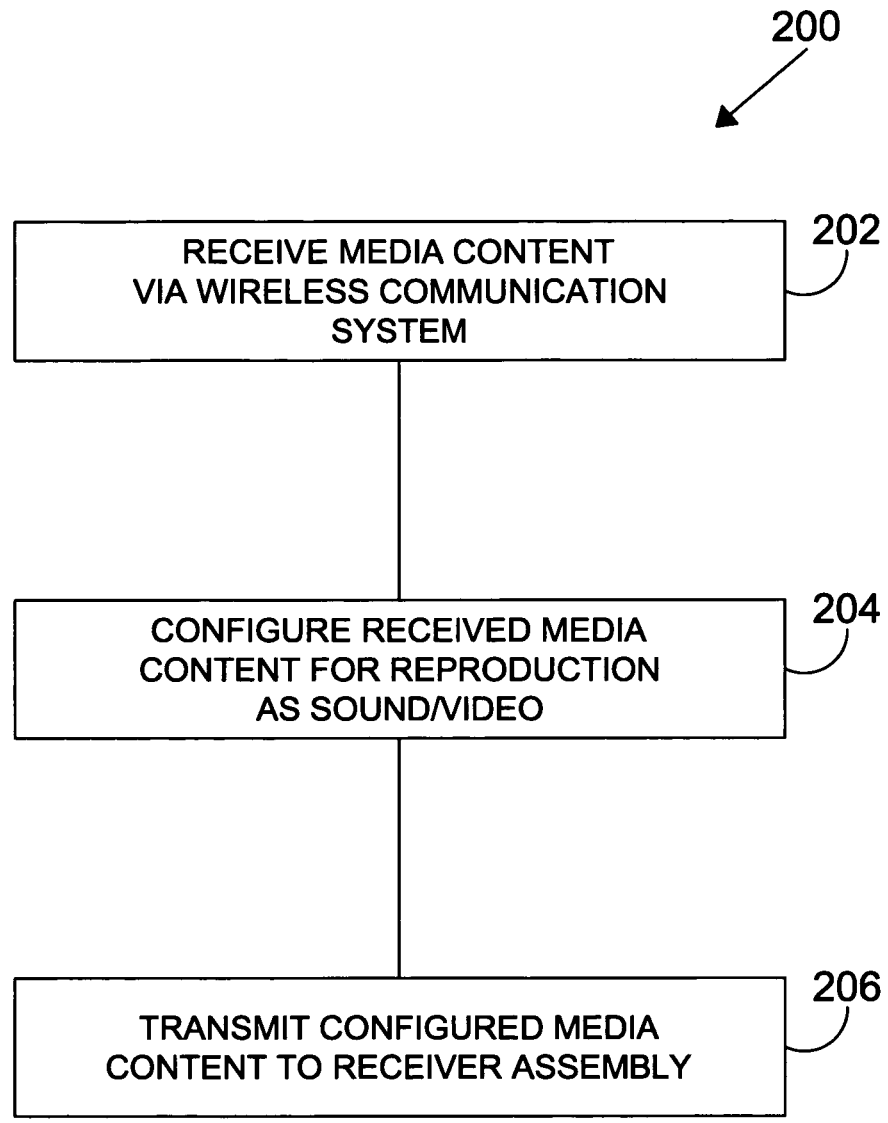
FIG. 3 is a flow diagram illustrating a method for transmitting media content from a mobile telephone to a receiver assembly in proximity to the mobile telephone, in accordance with an exemplary embodiment of the present invention.

Referring now to FIG. 3 a method 200 for transmitting media content from a mobile communication device, such as the mobile telephone 100 shown in FIGS. 1 and 2, to a receiver assembly in proximity to the mobile telephone is described in accordance with an exemplary embodiment of the present invention. The mobile telephone includes a housing sized to be held within the hand of a user, a transceiver assembly at least substantially contained within the housing for communicating information with a wireless communication network, and a transmitter assembly at least substantially contained within the housing for transmitting media content to the receiver assembly. First, media content is received via the wireless communication network, 202. Next, the received media content is configured for reproduction as at least one of sound and video, 204. Finally, the configured media content is transmitted to the receiver assembly, 206.

In the exemplary embodiments, method 200 may be implemented as sets of instructions or software readable by the mobile telephone (e.g., software module 126 of FIG. 2). Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A mobile telephone, comprising:
a housing sized to be held within a hand of a user;
a transceiver assembly at least substantially contained within the housing and configured for communicating information with a wireless communication network, said transceiver assembly configured to receive media content in a form of data packets across said wireless communication network;
a memory at least substantially contained within the housing for storing media content received via the data packets across said wireless communication network; and
a FM RF transmitter assembly at least substantially contained within the housing for transmitting media content configured via frequency modulation (FM) for radio frequency transmission from the media content received via the data packets across said wireless communication network and stored in said memory to a FM receiver assembly including a radio tuner in proximity to the housing for reproduction of said media content, wherein said media content received via data packets across said wireless communication network is at least one of streaming audio or streaming video, a portion of the media content stored in the memory with a time delay and transmitted to the FM receiver assembly while a second portion of the media content is received via the data packets across said wireless communication network by the transceiver assembly.

2. The mobile telephone as claimed in claim 1, wherein the wireless communication network comprises at least one of a General Packet Radio Service (GPRS) bearer service, an Enhanced Data for GSM Evolution (EDGE) bearer service, a Universal Mobile Telecommunications System (UMTS) bearer service, a Code Division Multiple Access (CDMA) bearer service, a Personal Communications Service (PCS) bearer service, and a Time Division Multiple Access (TDMA) bearer service.

3. The mobile telephone as claimed in claim 2, wherein the wireless communication network provides access to the Internet, and the media content for transmittal to the receiver assembly comprises media content streamed from an audio broadcast channel on the Internet.

4. The mobile telephone as claimed in claim 1, wherein the media content stored for transmittal to the receiver assembly comprises a file stored in a compressed audio file format.

5. A method for transmitting media content from a mobile telephone to a receiver assembly in proximity to the mobile telephone, the mobile telephone having a housing sized to be held within a hand of a user, a transceiver assembly at least substantially contained within the housing for communicating information with a wireless communication network, a memory at least substantially contained within the housing for storing media content received via the wireless communication network and a transmitter assembly at least substantially contained within the housing for transmitting media content to the receiver assembly, the method comprising:

receiving the media content via the wireless communication network, the media content received via the wireless communication network being in a form of data packets;

storing the media content in the form of data packets received from the wireless communication network in the memory;

retrieving the stored media content from said memory after a timed delay;

configuring the received media content in the form of data packets for reproduction as at least one of sound and video, wherein the step of configuring the received media content for reproduction as at least one of sound and video comprises configuring the received media content via frequency modulation (FM) for radio frequency (RF) transmission; and transmitting the configured media content to the receiver assembly, wherein said media content received via the wireless communication network in the form of data packets is at least one of streaming audio or streaming video, a portion of the media content stored in the memory with the timed delay and transmitted to the receiver assembly while a second portion of the media content is received via the wireless communication network.

6. The method as claimed in claim 5, wherein the wireless communication network comprises at least one of a General Packet Radio Service (GPRS) bearer service, an Enhanced Data for GSM Evolution (EDGE) bearer service, a Universal Mobile Telecommunications System (UMTS) bearer service, a Code Division Multiple Access (CDMA) bearer service, a Personal Communications Service (PCS) bearer service, and a Time Division Multiple Access (TDMA) bearer service.

7. The method as claimed in claim 6, wherein the wireless communication network provides access to the Internet, and the media content for transmittal to the receiver assembly comprises media content streamed from an audio broadcast channel on the Internet.

8. The method as claimed in claim 5, wherein the media content stored for transmittal to the receiver assembly comprises a file stored in a compressed audio file format.

9. A mobile communication device configured to transmit media content to a receiver assembly in proximity to the mobile communication device, comprising:

a transceiver for communicating information with a wireless communication network, said transceiver receiving media content in a form of data packets across said wireless communication network;

a memory for storing media content received via the data packets across said wireless communication network;

a processing system for executing a program of instructions, the program of instructions for configuring media content received via the data packets across said wireless communication network into a video format; and a transmitter for transmitting the configured media content in said video format to the receiver assembly, wherein the configured media content in said video format is transmitted through at least one of Bluetooth, wireless USB or television transmission, wherein said media content received through the data packets across said wireless communication network is streaming video, a portion of the media content stored in said memory with a time delay and transmitted to the receiver assembly while a second portion of the media content is received via the data packets across said wireless communication network by the transceiver.

10. The mobile communication device as claimed in claim 9, wherein the wireless communication network comprises at least one of a General Packet Radio Service (GPRS) bearer service, an Enhanced Data for GSM Evolution (EDGE) bearer service, a Universal Mobile Telecommunications System (UMTS) bearer service, a Code Division Multiple Access (CDMA) bearer service, a Personal Communications Service (PCS) bearer service, and a Time Division Multiple Access (TDMA) bearer service.

11. The mobile communication device as claimed in claim 10, wherein the wireless communication network provides access to the Internet, and the media content for transmittal to the receiver assembly comprises media content streamed from an audio broadcast channel on the Internet.

12. The mobile communication device as claimed in claim 9, wherein the media content stored for transmittal to the receiver assembly comprises a file stored in a compressed file format.

* * * * *